United States Patent [19]

Nagaoka et al.

[11] 4,008,612
[45] Feb. 22, 1977

[54] LIQUID QUANTITY DETECTING DEVICE

[75] Inventors: Tateki Nagaoka, Tokyo; Yoshimasa Kimura, Kawasaki; Yutaka Komiya, Tokyo, all of Japan

[73] Assignee: Canon Kabushiki Kaisha, Tokyo, Japan

[22] Filed: Sept. 17, 1975

[21] Appl. No.: 614,183

[52] U.S. Cl. .............................. 73/290 R; 73/297; 340/244 R
[51] Int. Cl.² ................. G08B 21/00; G01F 23/00
[58] Field of Search ............ 73/290 R, 297, 298; 340/237, 244 R; 355/10

[56] References Cited

UNITED STATES PATENTS 2,722,678   11/1955   Kelly .................................. 340/244

FOREIGN PATENTS OR APPLICATIONS

729,793   3/1966   Canada ............................... 73/297

*Primary Examiner*—S. Clement Swisher
*Attorney, Agent, or Firm*—Fitzpatrick, Cella, Harper & Scinto

[57] ABSTRACT

A liquid quantity detecting device comprises a liquid container, liquid circulating means disposed within the liquid container, and means for detecting bubbles created by the liquid circulating means when the liquid level has been lowered. Thus, decrease in quantity of liquid may be detected in accordance with the detection signal from the detector means.

20 Claims, 19 Drawing Figures

LIQUID QUANTITY DETECTING DEVICE

BACKGROUND OF THE INVENTION

1. Field of the Invention

This invention relates to a device for detecting the quantity of liquid within a liquid container, for example, the quantity of the developing liquid within a liquid developing device in a copying machine.

2. Description of the Prior Art

Usually in copying machines of the liquid development type, the toner in the developing liquid is consumed with the process of copying and the concentration thereof is decreased while, at the same time, the quantity of the carrier liquid is also decreased, thus decreasing the quantity of the developing liquid within the developing device. It is therefore important to provide good copy images not only that toner or concentrated liquid be sometimes supplied to thereby maintain a predetermined concentration but also that the decrease in quantity of the liquid be warned or carrier liquid be supplied to maintain the liquid at a predetermined quantity.

Detection of the quantity of liquid within the developer container has heretofore been done as by detecting the position of a float on the liquid surface, optically detecting the liquid surface directly, or measuring the electrical resistance of the liquid corresponding to the differential of the liquid quantity.

Detection using a float has encountered difficulties in installation of the float and also required another switch for detecting the position of the float, and in addition, suffered from detection errors caused by the vibration of the liquid surface.

The optical method of directly detecting the level of the liquid surface by the use of a light source and a photoelectric element provided within the container has experienced a problem that when the liquid level is lowered, toner or other dust particles are deposited and solidified on the photoelectric element exposed, thereby aggravating the detection accuracy, or a problem that detection errors are induced by vibration of the liquid surface.

The detection of the liquid quantity utilizing the electrical resistance of the liquid might electrically impart an adverse effect to the liquid and is not preferable for the detection of the quantity of developing liquid.

When the liquid level is lowered, it is also usually the case that the air is sucked by a pump which pumps up the developing liquid and as the result, the air is formed into bubbles and mixed with the developing liquid. If the developing operation is continued with such bubbles created and remaining in the liquid, the resultant copy images will remarkably suffer from irregular developement or other deterioration in quality of image.

Such inconveniences could not quickly be overcome by any of the conventional detection methods.

Further, there is a well-known method of detecting the concentration of developing liquid by detecting the degree of transparency of the liquid with the aid of the light passed therethrough. However, in order to detect the quantity and concentration of the developing liquid and in addition, to maintain the quantity and concentration of the liquid at predetermined levels, different detector means must be mounted in the developing device and this is quite cumbersome.

SUMMARY OF THE INVENTION

It is an object of the present invention to eliminate the above-noted disadvantages peculiar to the prior art and to provide a liquid quantity detecting device which suffers little from the detection errors resulting from the vibration of the liquid surface, stains of the detector member or other factors.

It is another object of the present invention to provide a liquid quantity detecting device in which a single detector member performs the functions of detecting the concentration of the liquid and detecting the quantity of the liquid.

It is still another object of the present invention to provide a liquid quantity detecting device which can quickly prevent deterioration of copy images which would otherwise result from the presence of bubbles in the developing liquid used with a copying machine.

It is yet still another object of the present invention to provide a liquid quantity detecting device in which a detection signal for bubbles is controlled by a detection signal for concentration to thereby accomplish highly accurate detection.

It is a further object of the present invention to provide a liquid quantity detecting device which, upon detection of a decrease in quantity of liquid, is effective to discontinue the operation of a copying machine or the like and also to discontinue the toner supply operation effected by a discrimination signal for decreased concentration.

It is a further object of the present invention to provide a liquid quantity detecting device which, while operating to supply toner in accordance with the discrimination signal for decreased concentration, will still produce an alarm if the concentration continues to decrease until the liquid becomes almost transparent.

Thus, according to the present invention, bubbles mixed with the liquid as it is decreased in quantity may be detected from sharp decrease in concentration (sharp increase in transparency) or from the AC component of the concentration signal to thereby enable the decrease in quantity of the liquid to be discriminated. Therefore, the present invention which catches the creation of bubbles to perform detection of the liquid quantity is highly effective in that it quickly prevents deterioration of image quality and that it eliminates the necessity of providing any special means for detecting the liquid level.

The above objects and other features of the present invention will become more fully apparent from the following detailed description of the invention taken in conjunction with the accompanying drawings.

DESCRIPTION OF THE PREFERRED EMBODIMENTS

Figure 1:
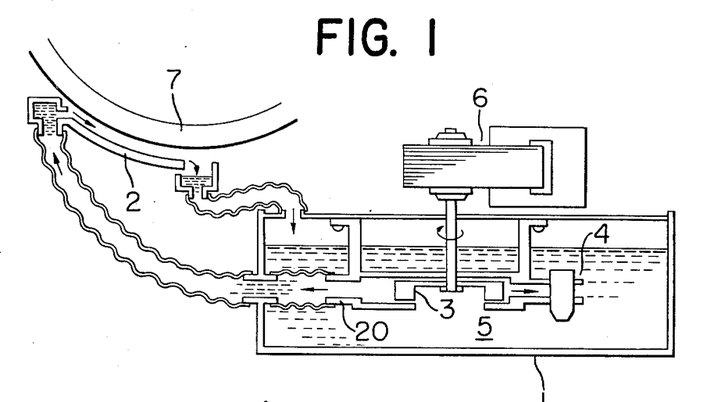
FIG. 1 is a cross-sectional view of a liquid developing device provided with the liquid quantity detecting device according to the present invention.

Referring to FIG. 1, there is shown an example of the liquid developing device in which developing liquid is pumped up. It includes a developer container 1, a developer guide plate 2 forming a developing station, a pump 3, optical or acoustic detector member 4 for detecting bubbles or concentration, a pool of developing liquid 5, and an electric motor 6 for rotating the pump. Designated by 7 is a photosensitive medium wrapped around a copying drum. During copying operation, the quantity of the developing liquid pumped out by the pump 3 driven from the motor 6 fills the clearance between the developer guide plate 2 and the photosensitive medium 7 to develop an electrostatic latent image thereon into a visible image, whereafter that quantity of the developing liquid is returned into the container 1. By such operation being continuously repeated, the toner in the developing liquid 5 is necessarily decreased to reduce the concentration and quantity of the liquid in the developer container 1.

When the developing liquid maintains a predetermined quantity, the detector member 4 acts as a concentration detecting member whose detection signal is applied to a well-known concentration discriminating circuit. If the concentration is decreased below the predetermined value, the detection signal will operate an electromagnetic valve to provide a fresh supply of toner.

As the quantity of developing liquid is then decreased to reduce the liquid level to the vicinity of the pump 3 with bubbles mixed into the liquid, the detector member 4 acts as a liquid quantity detecting member. In this case, the pump 3 is operating to pump up the developing liquid onto the developer guide plate 2 whether the fan of the pump is exposed to the air or lies under the liquid surface, and therefore the pump is giving out a force which will suck the air into the developing liquid, so that the air sucked into the developing liquid forms bubbles which are circulated with the liquid. In order to detect such bubbles, the detector member 4 is provided in the vicinity of the pump 3. The detection signal produced by the detector member is applied as an input to the liquid quantity discriminating circuit of the present invention, the output of which effects indication or stops the machine from operating.

Creation of bubbles due to the lowering of the liquid level is customary to liquid circulating means such as a stirrer fan, liquid supply pipe, etc. which are normally under the liquid level.

The detector member 4 which, although lying within the liquid can still detect the lowering of the liquid level, is always washed by the liquid. Thus, the detector member 4 is free of toner particles deposited and solidified thereon and this leads to a great advantage of the present invention in that there is little or no detection error.

Figure 2:
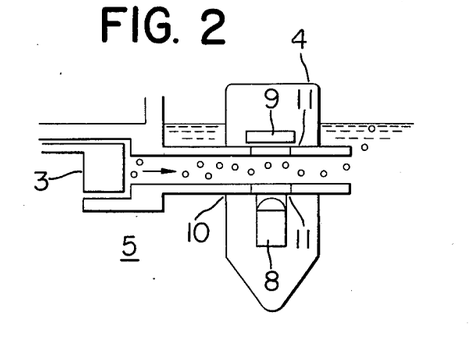
FIG. 2 is a cross-section of the detecting portion of the liquid quantity detecting device according to the present invention.
Figure 5:
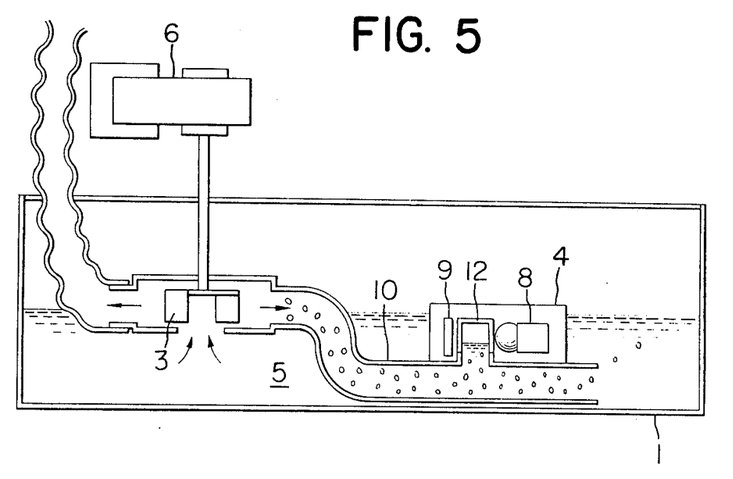
FIG. 5 shows, in cross-section, a liquid developing device provided with a further example of the detecting portion according to the present invention.

FIG. 2 shows a specific form of the detector member 4 for detecting bubbles and concentration in the liquid quantity detecting device according to the present invention. The detector member comprises a light source 8 such as lamp or the like, and a light-sensing element 9 such as CdS cell or the like. The light source 8 and the light-sensing element 9 are disposed in opposed relationship, and interposed therebetween is the transparent portion 11 of a conduit 10 through which the developing liquid is delivered from the pump. The light-sensing element 9 is shielded so that any light other than that which is necessary may not impinge thereon. One end of the conduit 10 is open near the blade of the pump 3 and the other end is so disposed that, when the liquid level lowers to the vicinity of the pump 3, the sucked air in the form of bubbles may be introduced into the conduit. If the conduit 10 is bent in the manner as shown in FIG. 5, there will be no danger of the light-sensing element 9 being exposed above the liquid level.

The detector member 4 may alternatively be disposed on a pipe 20 (FIG. 1) which serves to deliver the liquid from the pump up to the liquid guide plate 2.

Figure 8:
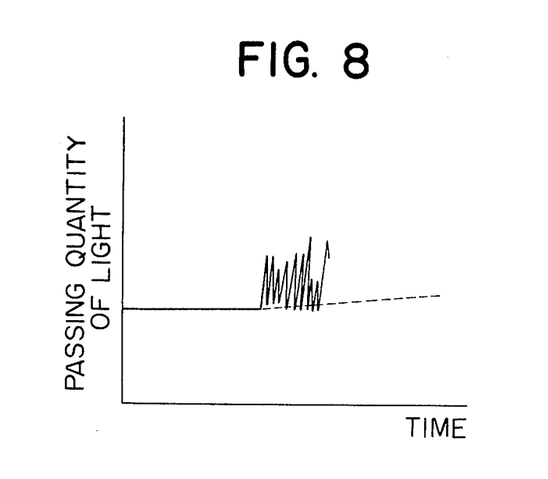
FIG. 8 is a graph illustrating the vibration in quantity of light received by a detector element in the detecting device of the present invention when bubbles are mixed into the liquid.

When the developing liquid is in such a condition that the concentration of the liquid introduced into the conduit 10 has been reduced but the quantity of the liquid has not so much decreased as to permit mixing of bubbles therewith, the detection signal of the light-sensing element 9 will be provided in the form of a resistance variation corresponding to a slow increase in the quantity of light passed through the developing liquid, as indicated by the dotted-line curve in the graph of FIG. 8. However, if the quantity of the developing liquid is decreased, bubbles will occur in the liquid and be introduced into the conduit 10, as already noted.

In the latter case, the portion of the developing liquid which corresponds to the bubbles will sharply increase its transparency so that the detection signal of the light-sensing element 9 will be provided in the form of a resistance variation corresponding to a sharp variation in the quantity of light passed through the developing liquid, as indicated by the solid-line graph in FIG. 8.

The present invention, as will further be described, detects bubbles from a sharp variation in the resistance of the light-sensing element 9 or from a resistance variation in the form of repeated rise and fall appearing within a short time, and discriminates the reduced quantity of liquid in accordance with the detection signal produced thereby.

FIGS. 3 to 7 show some arrangements of the detector member 4 (for example, the light source 8 and the light-sensing element 9) suited for the detection of the bubbles.

Figure 3:
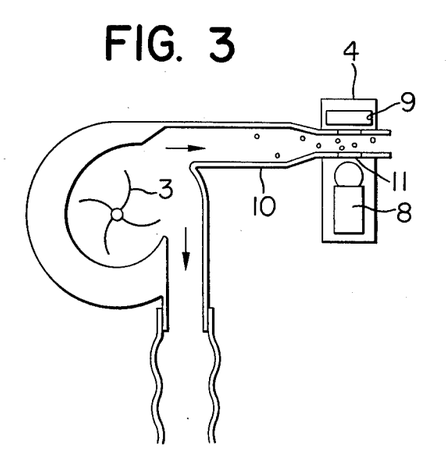
FIG. 3 is a plan view showing another example of the detecting portion according to the present invention as seen from above the liquid surface.

FIG. 3 is a plan view of the detecting portion of FIG. 2 as seen from above the liquid level. The transparent portion 11 of the conduit 10 is reduced in cross-section. By doing so, the quantity of light passed from the light source 8 through the transparent portion may be substantially increased as compared with the arrangement of FIG. 2, and this in turn leads to a substantial increase in the proportion of the bubbles to the liquid in such portion and, accordingly, to a higher detection output of the light-sensing element 9.

Figure 4A:
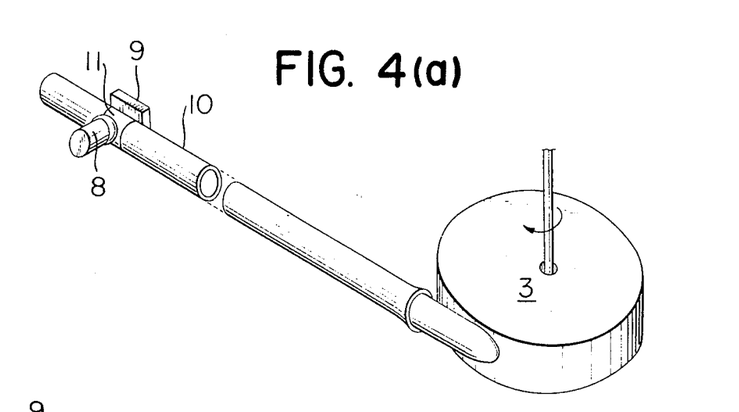
FIGS. 4(a) and (b) are a perspective view and a cross-sectional view, respectively, of another example of the detecting portion according to the present invention.
Figure 4B:
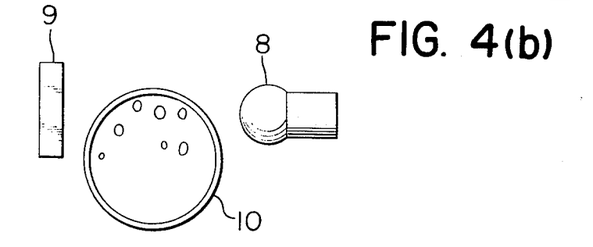

FIG. 4 shows an arrangement in which the pair comprising light source 8 and light-sensing element 9 is disposed parallel to the liquid surface as shown in (a) and at a level corresponding to the upper portion of the conduit 10 as shown in (b). With such an arrangement, creation of the bubbles which originally move along the upper portion of the conduit 10 can be quickly detected and the proportion of the bubbles to the liquid can be higher in this portion, thus increasing the detection output.

FIG. 5 shows a further arrangement in which a transparent buffer portion 12 for storing bubbles therein is provided to the conduit 10 so that the quantity of light passed through the buffer portion 12 may be detected by the detector member 4. By doing so, there may be provided a detection output corresponding to the quantity of bubbles created and, accordingly, the detection of the creation of bubbles may be easier and higher in accuracy. The air stored in the buffer portion 12 may be exhausted to the outside by manually opening a plug or the like after replenishment of the liquid. This may preferably be done by displacing the buffer portion 12 to a position opposite to that shown in FIG. 5, that is, to a position underlying the conduit 10.

Figure 6A:
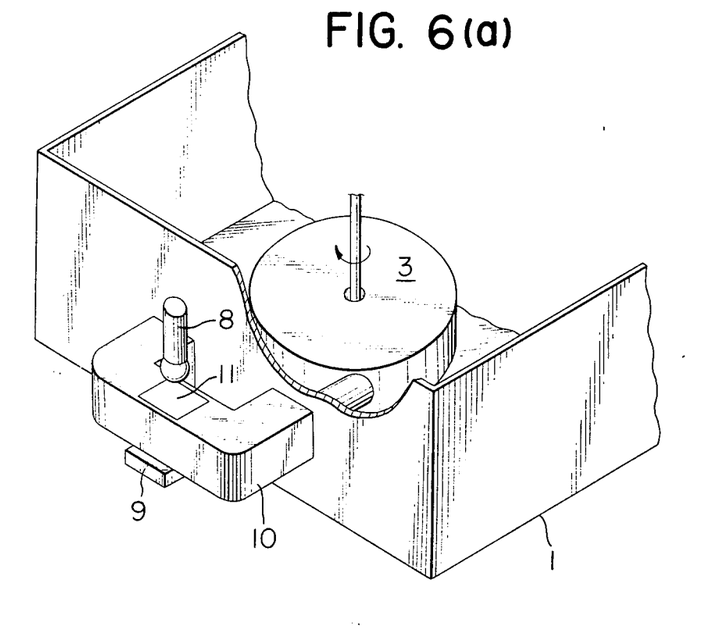
FIGS. 6(a) and (b) are a perspective view and a plan view, respectively, of still a further example of the detecting portion according to the present invention.
Figure 6B:
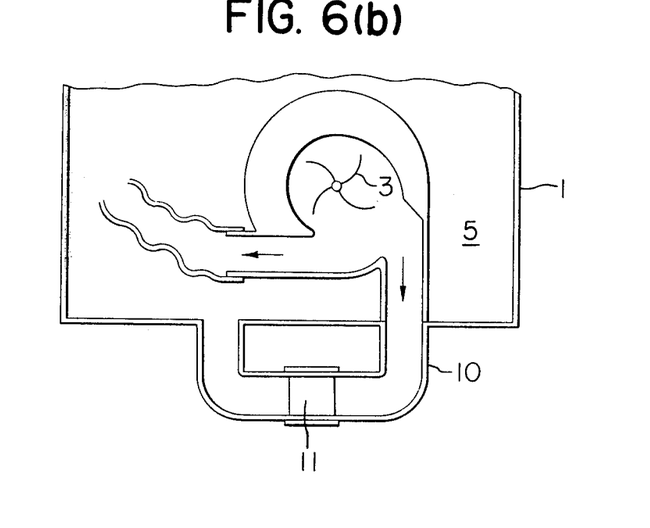

FIGS. 6(a) and (b) are a perspective view and a horizontal cross-section, respectively, showing an arrangement in which the conduit 10 extends outwardly of the developer container 1 and is provided with a transparent portion 11 so that bubbles may be detected by the cooperation between the light source 8 and the light-sensing element 9. This arrangement will permit easy replacement of the light source 8 when the filament thereof is broken.

Figure 7:
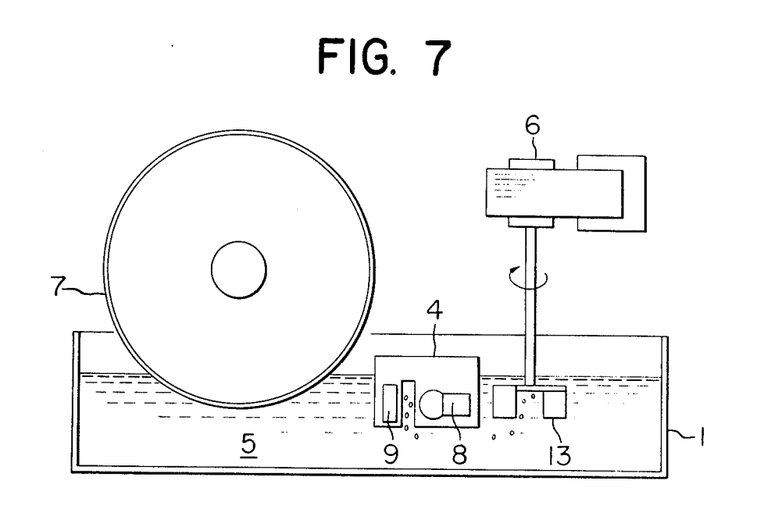
FIG. 7 is a cross-sectional view of another liquid developing device provided with the liquid quantity detecting device according to the present invention.

FIG. 7 shows another embodiment of the developing device to which the present invention is applied and in which the photosensitive medium 7 wrapped around the copying drum is directly bathed on the developing liquid 5 within the developer container 1 to thereby develop a latent image. A fan 13 is provided to stir the developing liquid 5 and the detector member 4 is disposed near the fan 13 to detect the bubbles created by the fan 13 with the reduction in quantity of the developing liquid.

In any of the various forms of the detecting portion described above, it is also possible to use an ultrasonic oscillator and an ultrasonic receiver instead of the light source 8 and the light-sensing element 9, respectively, to detect the reduction in quantity of the developing liquid from the variation in sound pressure caused by the bubbles or to use an electrode to detect the variation in quantity of the liquid from the variation in electrostatic capacity caused by the bubbles. In any of the various forms, it is further possible to change the locations of the light source 8 and light-sensing element 9 so as to detect the variation in quantity of the light reflected by the bubbles.

Figure 9:
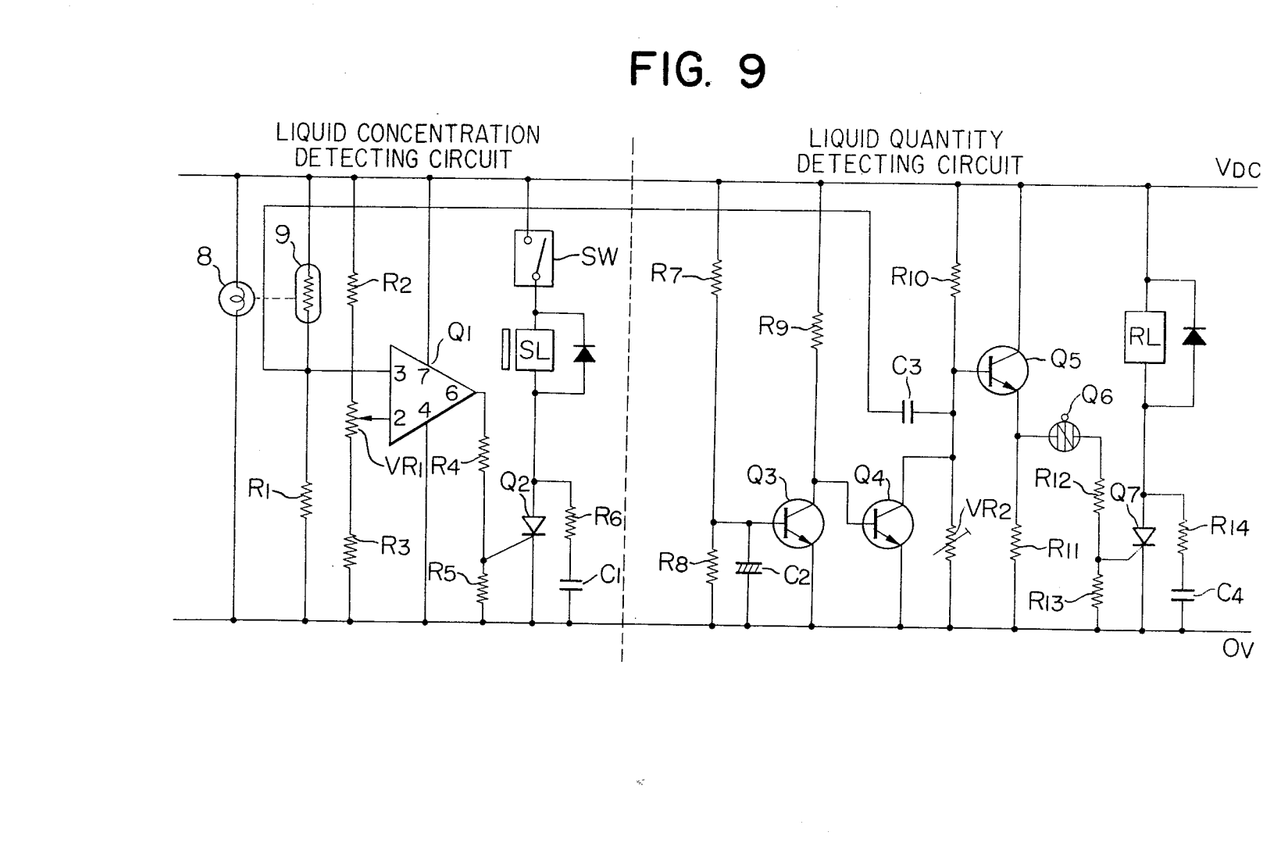
FIG. 9 diagrammatically shows an example of the liquid quantity detecting circuit according to the present invention.
Figure 11:
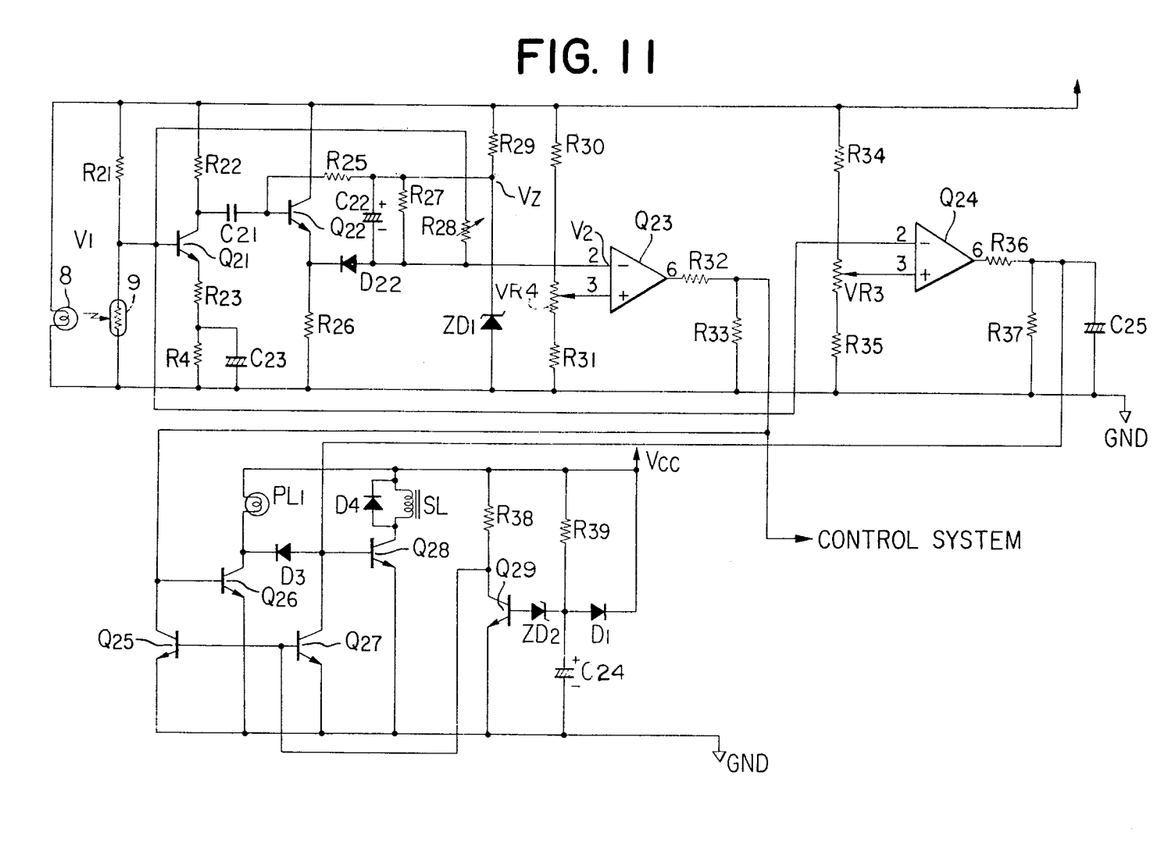
FIG. 11 diagrammatically shows another example of the liquid quantity detecting circuit according to the present invention.

Reference will now be had to FIGS. 9 and 11 to explain two methods of discriminating the reduction in quantity of the liquid in accordance with a signal resulting from the presence of bubbles, as well as to explain an example of the circuit for supplying toner at a predetermined concentration or lower.

In FIG. 9, the light source 8 and the light-sensing element 9 are such that one terminal of the light-sensing element 9 is connected to the terminal 3 of an operational amplifier Q1 and to a transistor Q5 through a capacitor C3. When the concentration of the developing liquid is gradually decreasing due to the repeated development, the resistance value of the light-sensing element 9 is decreased, as already noted, and the input potential at the terminal 3 of the operational amplifier Q1 is increased and, when this potential becomes higher than the potential preset by the variable resistance VR of the terminal 2 of the amplifier Q1, there is provided an output potential at the terminal 6 of the amplifier Q1. By this output, a signal is applied to the gate terminal of a thyristor Q2. When a toner supply timing switch SW is closed in this condition, a source voltage $V_{DC}$ is applied to the thyristor Q2 through a solenoid SL so that the thyristor Q2 conducts to energize the solenoid. By the action of the solenoid SL so energized, toner is supplied to the developing liquid from a toner replenishment bin or the like, not shown. The toner supply timing switch SW serves to prevent the thyristor Q2 from continuing to ignite and also serves to intermittently supply the toner to prevent any excessive supply thereof, and may be formed by a cam and a microswitch attached to a rotary disc which provides a sequence control element in a copying machine. Alternatively, the switch SW may be switch-controlled by a charge-discharge circuit comprising a capacitor and a resistor so as to be opened and closed at a suitable time interval.

Next, when the concentration of the developing liquid is increased, the resistance value of the light-sensing element 9 is increased so that the input potential at the terminal 3 of the operational amplifier Q1 falls. When this potential falls below the potential at the terminal 2 of the amplifier Q1, the potential at the terminal 6 of the amplifier Q1 is decreased to stop the thyristor Q2 from triggering. In this condition, even if the toner supply timing switch SW is closed, the thyristor Q2 does not conduct and, consequently, the solenoid SL is not energized and thus toner supply operation does not take place. In the above-described variation in concentration of the developing liquid, it is not possible for the toner to be sharply decreased or increased and, therefore, the variation with time in resistance of the light-sensing element 9 is small, that is, the variation with time in voltage drop of the element 9 is low. However, if bubbles are created in the developing liquid, the variation with time in voltage drop of the light-sensing element 9 will be greater as shown in FIG. 8.

A first discriminating system of the present invention is one which discriminates the reduction in quantity of light in accordance with such a sharp variation in detection output. The light-sensing element 9 is connected to the liquid quantity detecting circuit through a capacitor C3, and the base of a transistor Q5 is connected to a variable resistor VR2 and a transistor Q4.

Operation will now be described. In FIG. 4, due to the sharp voltage change resulting from the sharp decrease in resistance value of the light-sensing element 9, the potential at the junction between the light-sensing element 9 and the resistor R1 is applied to the base of the transistor Q5 through the capacitor C3. More specifically, since the impedance of the capacitor C3 is set so that it is sufficiently great for a slow variation with time in the potential at said junction and sufficiently small for a sharp variation with time in the potential at said junction, a voltage approximate to the source voltage $V_{DC}$ is applied to the base of the transistor Q5 through the capacitor C3. Thus, the transistor Q5 is rendered conductive by this potential and the emitter potential thereof is increased through a resistor R11. When this potential reaches a level above the trigger voltage of a trigger diode Q6, this trigger diode conducts to apply a trigger signal to the gate terminal of a thyristor Q7. The thyristor Q7 is thereby rendered conductive to energize the coil of a relay RL and by the contact of this relay, a decrease in quantity of the liquid is indicated or a supply valve for replenishment liquid is operated or the copying operation is discontinued.

The resistance values of resistors R10 and VR2 are set so that the trigger diode Q6 does not conduct when the capacitor C3 is not in a short-circuited condition, namely, when the light-sensing element 9 is not detecting the bubbles.

A timer circuit formed by resistors R7, R8, R9, capacitor C2 and transistors Q3, Q4 serves to prevent the emitter potential of the transistor Q5 from rising to render the trigger diode Q6 conductive due to momentary short-circuited condition of the capacitor C3 immediately after the application of the source voltage $V_{DC}$. More specifically, the capacitor C2 in the timer circuit is approximately in short-circuited condition for a short time immediately after the application of the source voltage $V_{DC}$, so that the base potential of the transistor Q3 is too low to operate the transistor Q3. Accordingly, the base potential of the transistor Q4 is approximate to the source voltage and it is therefore conductive with the result that the base potential of the transistor Q5 approximates zero and, thus, the emitter potential of the transistor Q5 is not increased, whereby the trigger diode Q6 is prevented from conducting.

FIG. 11 diagrammatically shows the liquid quantity discriminating circuit according to a second system of the present invention. The effect of this circuit is graphically illustrated in FIG. 10.

According to this system, the repetitive variation in quantity of passed light due to the presence of bubbles as shown (such variation being an AC component) is applied to discriminate whether or not the quantity of liquid is at its maximum level, and the result is produced. This is free of erroneous detection and can produce a highly accurate detection output.

Further, in the present circuit, the signal provided by said AC component is controlled and corrected by a signal representing the average concentration of the liquid so that the decrease in quantity of the liquid may be detected over a wide range for the concentration of the liquid. Thus, even if the concentration of the developing liquid has become so low as to lose developing capability and to make the bubble detection difficult, the decrease in quantity of the liquid may still be indicated by the correction output to thereby stop the copying operation.

In FIG. 11, the concentration detecting portion will first be described. One end of the light-sensing element 9 is connected to the terminal 2 of an operational amplifier Q24, the output terminal 6 of which is connected to the base of a transistor Q28 through a resistor R36. The collector of transistor Q28 is connected to the voltage source $V_{CC}$ through a toner supply solenoid SL.

Figure 10A:
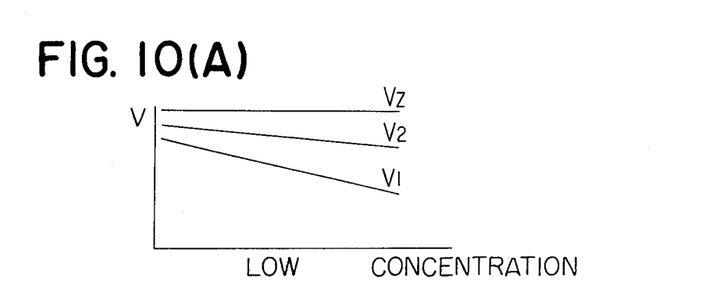
FIG. 10 graphically illustrates signal waveforms at various terminals in FIG. 9.
Figure 10B:
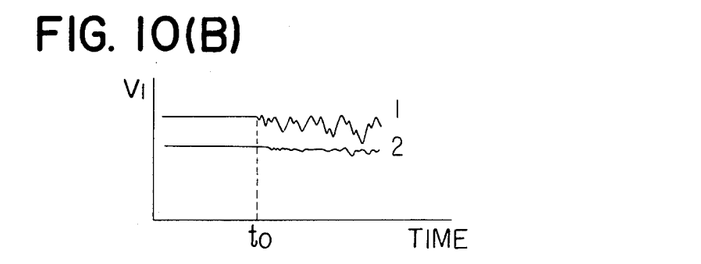

In operation, the resistance of the light-sensing element 9 is decreased with decreasing concentration of the developing liquid and, thus, the voltage $V_1$ across the light-sensing element 9 drops as shown in FIG. 10(a). When this voltage drops to a level below the voltage at the terminal 3 set by a variable resistor VR3, the operational amplifier Q24 puts out the source voltage $V_{CC}$. By this output, the transistor Q28 is operated to energize the solenoid SL so that toner is supplied from an unshown supply source to the developing liquid. As the concentration of the developing liquid is increased by such toner supply, the output of the operational amplifier Q24 becomes substantially null, thus discontinuing the toner supply.

Figure 13:
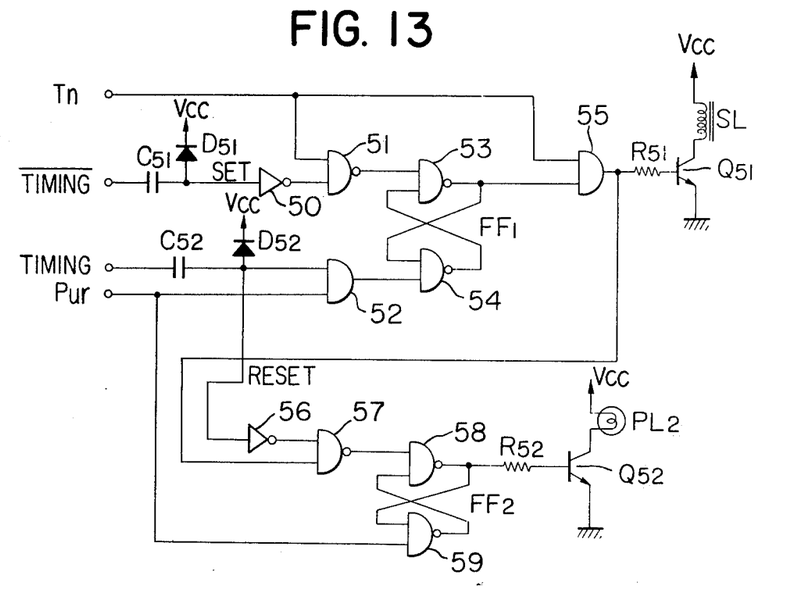
FIG. 13 diagrammatically shows an additional circuit in which the present invention is applied.

If the concentration of the developing liquid is not increased in spite of the toner supply, it means that there is no toner in the supply source, and therefore the circuit of FIG. 13 (which will further be described) is operated to indicate the absence of toner.

The portion for detecting a decrease in quantity of the liquid will now be considered. The light-sensing element 9 connected to the concentration discriminating operational amplifier Q24 is also connected to the base of the bubble detecting transistor Q21 and to the input terminal 2 of the liquid quantity discriminating operational amplifier Q23 through a resistor R28. The collector of the transistor Q21 is connected through a coupling capacitor C21 to the base of a transistor Q22, the emitter of which is connected to the input terminal 2 of the operational amplifier Q23 through an integration circuit comprising a diode D22, a capacitor C22 and a resistor R27. A resistor R25, a capacitor C22 and resistor R27 for imparting a bias to the base of the transistor Q22 are connected to a Zener diode ZD1. The output terminal 6 of the operational amplifier Q23 is connected through a resistor R32 to the stop control system of the copying machine and also to the base of a transistor Q26, the collector of which is connected to a lamp PL1 for indicating the decrease in quantity of the liquid, and to the base of a transistor Q28 through a diode D3.

Signal waveforms will now be considered. When there is no bubble created, the detection output signal of the light-sensing element 9 is varied with respect to the concentration as indicated by $V_1$ in FIG. 10(a) and the input signal of the operational amplifier Q23 is varied by the resistors R27 and R28 as indicated by $V_2$ in FIG. 10(a). However, when bubbles are mixed with the developing liquid at a point of time $t_0$, the quantity of passed light is momentarily and sharply increased as already noted in connection with FIG. 8. In this case, for a proper concentration and for a very thin concentration, the detection output of the light-sensing element 9 is varied as indicated by 1 and 2 in FIG. 10(b), respectively. It will thus be seen that the detection signal $V_1$ undergoes a great sharp drop when there is a certain degree of concentration but it undergoes little variation when the concentration is very thin.

In the operation of the circuit, when bubbles are detected, the signal voltage $V_1$ from the light-sensing element 9 is amplified by the transistor Q21 and has the DC component thereof removed by the capacitor C21, so that the AC component alone is applied as input to the integration circuit through an impedance changing circuit comprising the transistor Q22. When the integration value exceeds a predetermined voltage, namely, when the input voltage $V_2$ of the operational amplifier Q23 becomes lower than the voltage set by the variable resistor $VR_4$, the terminal 6 produces an output approximate to the source voltage $V_{CC}$ to operate the transistor Q26. Thus, by the transistor Q26, the lamp PL1 is energized to indicate the decrease in quantity of the liquid and the base potential of the transistor Q28 is made null, thus deenergizing the solenoid SL. In this manner, the detection of bubbles is effected through the detection of the AC component and this prevents any malfunctioning from occurring due to the presence of a few bubbles or irregular concentration, thus achieving a highly accurate detection.

In this circuit, it is to be noted that when there is no bubble and the developing liquid is at a degree of concentration which enables development to be performed, there is no output provided from the operational amplifier Q23 (to the terminal 2 of which is applied the voltage $V_2$ shown in FIG. $10(a)$).

Figure 10C:
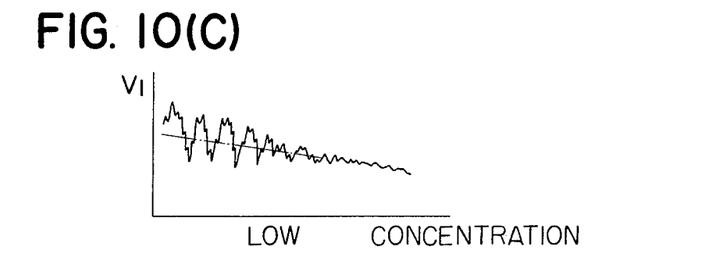
Figure 10D:
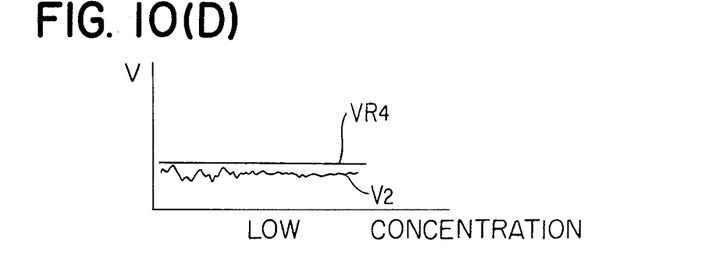

Now, as the concentration is extremely decreased, the pulse-like signal resulting from the bubbles is reduced in amplitude as shown in FIG. $10(c)$. Thus, the integration value produced by the integration circuit is decreased so that the input voltage of the operational amplifier Q23 exceeds the discrimination voltage $VR_4$, thus preventing the decrease in quantity of the liquid from being detected. However, by setting the value of the resistor R28 such that the decrease in the integration value may be compensated for, the decrease in quantity of the liquid may conveniently be detected even if the concentration is thin. That is, such decrease may be detected by discriminating the input signal $V_2$ of FIG. $10(d)$ with the aid of the voltage $VR_4$ at the terminal 3. Also, even if the developing liquid has become too thin to perform development, the operational amplifier Q23 can still provide its output to stop the machine from operating.

In the present circuit, resistors R32, R33, R36 and R37 provided at the respective output terminals 6 of the operational amplifiers Q23 and Q24 are intended to prevent the transistors Q26 and Q28 from being operated by the offset output voltages of the respective operational amplifiers which are of the order of several volts, and the resistance values of these resistors are set such that the transistors Q26 and Q28 are operated when the output terminals 6 are at the level substantially equal to the voltage $V_{CC}$, but they discontinue to operate when the voltage level at the output terminals 6 has dropped to the vicinity of the offset voltage.

The bases of transistors Q25 and Q27 are connected to the collector of a transistor Q29, the base of which is connected to a Zener diode ZD2 and to a timer circuit comprising a capacitor C24, a resistor R39 and a diode D1.

This timer circuit prevents the transistors Q26 and Q28 from malfunctioning during closing of a main switch SW, now shown. The operation of the timer circuit will now be explained. By the closing of the main switch, the capacitor C24 is brought into short-circuited condition and thus, the transistor Q29 remains inoperative. Therefore, the transistors Q25 and Q27 are operated to render the bases of the transistors Q26 and Q28 to zero potential. Consequently, the transistors Q26 and Q28 remain inoperative of any signal imparted to the bases thereof, as a result of which both the toner supply solenoid SL and the liquid quantity decrease indicating lamp PL1 remain unenergized.

Thereafter, the capacitor C24 is charged and the transistor Q29 is operated at a predetermined charge level of the capacitor, whereupon the transistors Q25 and Q27 are turned off to make the transistors Q26 and Q28 ready to operate.

When the main switch SW, not shown, is opened, the capacitor C24 discharges through the diode D1. However, the capacitor C24 normally stores therein a quantity of charge corresponding to the voltage drop (about 0.7 volt) of the diode D1 even after the main switch SW is opened, and this might lead to a possibility of the transistor Q29 being operated upon re-closing of the main switch. For this reason, the Zener diode ZD2 of the order of several volts is connected to the base of the transistor Q29.

Figure 12:
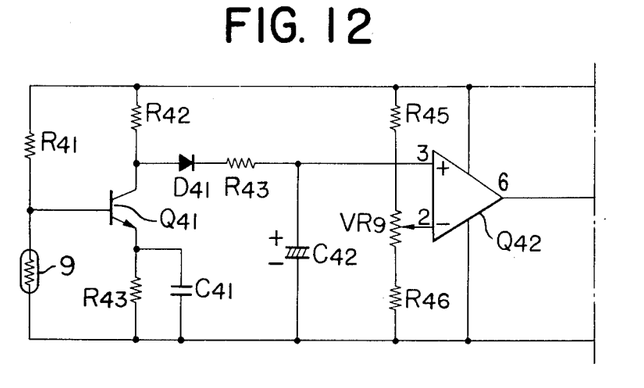
FIG. 12 is a diagram showing another example of the liquid quantity detecting system in FIG. 9.

FIG. 12 diagrammatically illustrates another example of the liquid quantity detecting portion shown in FIG. 11. This only requires a simple circuit arrangement because it is intended to discriminate the decrease in quantity of the liquid without separating the detection signal into a DC signal for the concentration and an AC signal for the bubbles. The light-sensing element 9 is connected through a transistor Q41 to an integration circuit comprising a resistor R43 and a capacitor C42. The integration circuit is in turn connected to the input terminal 3 of a discriminating operational amplifier Q42, the output terminal 6 of which is connected to a circuit for indicating the decrease in quantity of the liquid, in the same manner as described in connection with FIG. 11.

In operation, the detection signal of the light-sensing element 9 with DC and AC components therein is amplified by the transistor Q41 and stored in the capacitor C42 and, when the integration valve exceeds the voltage set by a variable resistor VR9, the operational amplifier Q42 produces an output.

In FIGS. 11 and 12, a detection waveform shaping circuit and a counter may replace the integration circuit so that the pulse resulting from bubbles may be counted to enable the decrease in quantity of the liquid to be detected by a predetermined count value. By using the FIG. 11 circuit with such arrangement, the decrease in quantity of the liquid may be detected with a very high accuracy.

Figure 14:
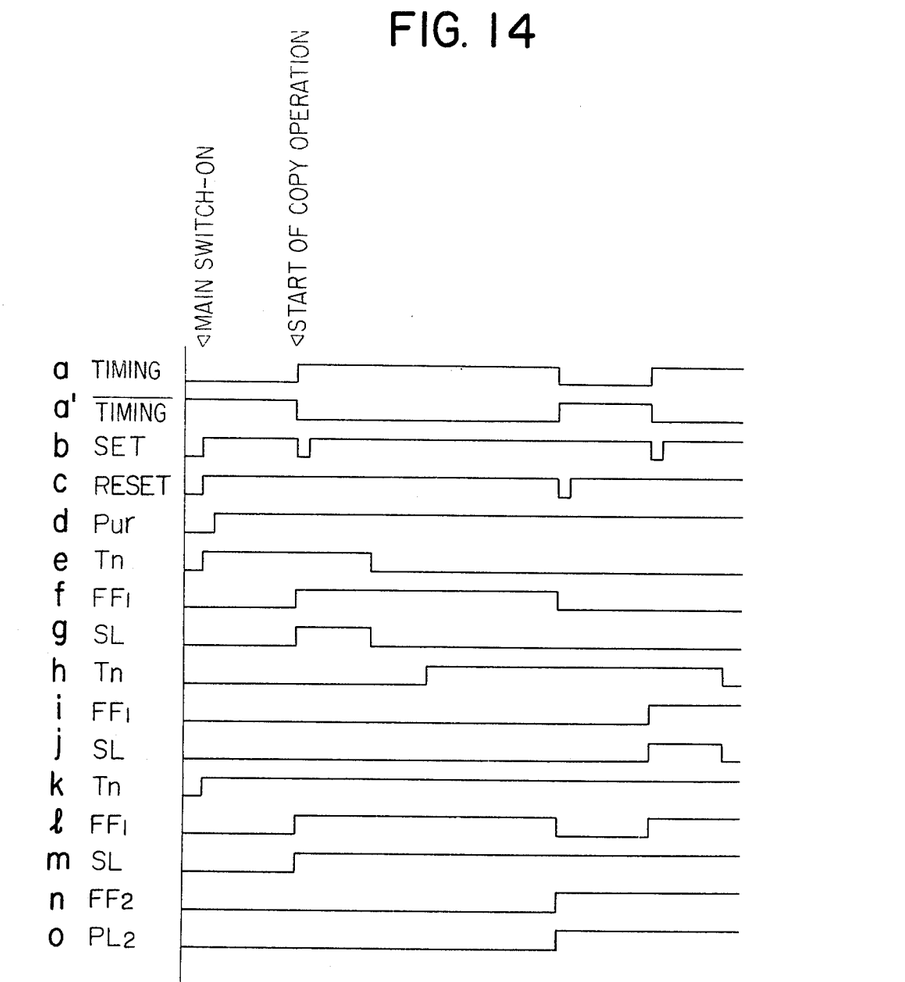
FIG. 14 is a time chart for various signals in FIG. 13.

FIG. 13 shows an application of the present invention which is for further improvement over the above-described embodiments. Means for detecting the presence of replenishment toner is additionally provided to produce an alarm when there is no replenishment toner. Thus, when the concentration of the liquid is reduced below an optimum level and keeps such a low level, it is impossible to leave the machine in its operative condition until the decrease in quantity or the very thin concentration of the liquid is indicated by the liquid quantity detecting circuit of FIG. 11. Accordingly, substantially three stages of concentration are monitored to ensure safe operation. The circuit of FIG. 13 is designed to permit toner supply to be started in response to a timing signal based on the copying operation of the copying machine and, further, to produce an alarm in accordance with the timing signal and a toner supply signal. FIG. 14 is a time chart for the various signals.

In the circuit of FIG. 13, the input of a flip-flop FF1 is connected through a NAND gate 51 and an inverter 50 to a first differentiation circuit comprising a capacitor C51 and a diode 51, and the output of the flip-flop FF1 is connected through an AND gate 55 and a resistor R51 to the base of a transistor Q51 for the toner replenishment. The reset terminal of the flip-flop FF1 is connected through an AND gate Q52 to a second differentiation circuit, comprising a capacitor C52 and a diode D52, and to a terminal PUR. The input of a flip-flop FF2 is connected to said second differentiation circuit through a NAND gate 57 and an inverter 56, and the output of the flip-flop FF2 is connected through a resistor R52 to an alarm producing transistor Q52. The signal Tn resulting from decrease in concentration is applied to the other input terminals of the NAND gate 51 and AND gate 55, and the toner supply signal from the AND gate 55 is applied to the other input terminal of the NAND gate 57.

In operation, the flip-flops FF1 and FF2 are in advance reset to their normal conditions by the signal Pur (FIG. 14d) produced by closing of the main switch. This eliminates the possibility of the flip-flops FF1 and FF2 producing their outputs immediately after the closing of the main switch. Subsequently, a copy button, not shown, is depressed to start the copy operation, whereafter a timing signal (FIG. 14a) is produced at each cycle of copy operation by the rotation of a copying drum or the movement of an original carriage.

When an inverted signal Timing (FIG. 14a:) is applied to the first differentiation circuit, there is produced a Set signal (FIG. 14b) at the leading edge of the timing signal. If there is obtained a signal inverted of the Set signal and a toner supply signal Tn as shown in FIG. 14e (for example, the output signal from the operational amplifier 24 in FIG. 11), a signal for level 0 will be applied to the flip-flop FF1, which thus puts out a level 1. Therefore, the signal Tn indicated at e and the signal FF1 indicated at f together energize the solenoid SL to effect toner supply for a time g.

Next, when the Set signal has been produced but the toner supply signal Tn is not yet present (FIG. 14h), the flip-flop FF1 is not set. Moreover, even of the toner supply signal Tn is put out after the Set signal has been put out, the flip-flop FF1 is not set and does not put out the level 1. However, by the leading edge of the Timing signal resulting from the subsequent copy cycle, the flip-flop FF1 is set, as indicated at i, and operates the solenoid SL for a time j to effect toner supply.

While a Set signal and a toner supply signal Tn have been produced to set the flip-flop FF1 to effect toner supply, there may be cases where the predetermined concentration is not restored even after the time of the Timing signal has passed. In such cases, the replenishment toner is regarded as being exhausted and the flip-flop FF2 is set by a Reset signal (FIG. 14c) produced at the trailing edge of the Timing signal, thereby energizing the alarm lamp PL2 (FIGS. 14k, l, m and n).

It is to be noted that the duration of the Timing signal is set to a length longer than the time from the start of energization of the solenoid SL until the developing liquid restores its predetermined concentration.

What is claimed is:

1. A liquid quantity detecting device comprising:
a liquid container;
liquid circulating means disposed within said container for circulating liquid through a predetermined path so that bubbles are produced in the liquid when the quantity of same decreases below a particular level; and
bubble detector means disposed adjacent said liquid path for detecting said bubbles and for producing a corresponding detection signal.

2. A liquid quantity detecting device according to claim 1, further comprising means responsive to the output from said detector means to discontinue operation of a machine using the liquid.

3. A liquid quantity detecting device according to claim 1, further comprising means coupled to said detector means for producing an output signal in response to predetermined variations in said detection signal, and output signal corresponding to the decreased quantity of said liquid.

4. A liquid quantity detecting device according to claim 1, further comprising means coupled to said detector means for discriminating the decrease in quantity of said liquid in response to the sensing of an A.C. component of said detection signal and for producing a corresponding output signal.

5. A liquid quantity detecting device according to claim 1, wherein said detection signal has an A.C. component and a D.C. component, said device further comprising circuit means coupled to said detector means for producing a bubble signal corresponding to the A.C. component of said detection signal, and for varying said bubble signal in accordance with the D.C. component of said detection signal.

6. A liquid quantity detecting device according to claim 1, further comprising means for detecting the concentration of said liquid and for producing a concentration signal when the concentration decreases below a predetermined value, and means for supplying concentrated liquid to said container in response to said concentration signal, said concentration detecting means comprising a portion of said bubble detector means.

7. A liquid quantity detecting device according to claim 1, wherein said detector means comprises a light source and a light sensing element disposed so that said bubbles are detected in response to variations of light which passes through said liquid and said bubbles.

8. A liquid quantity detecting device comprising:
a liquid container;
liquid circulating means disposed within said liquid container for circulating liquid through a predetermined path so that bubbles are produced in the liquid when the quantity of same decreases below a particular level;
detector means for detecting said bubbles and for producing a corresponding detection signal; and
means coupled to said detector means for producing an output signal in response to predetermined variations in said detection signal, said output signal corresponding to the decreased quantity of said liquid.

9. A liquid quantity detecting device according to claim 8, wherein said output signal producing means includes discrimination means for producing said output in response to the sensing of an A.C. component of said detection signal.

10. A liquid quantity detecting device according to claim 9, wherein said discriminating means has integration means for integrating the AC component of the detection signal from said detector means, and said discrimination output is produced at a predetermined integration value.

11. A liquid quantity detecting device comprising: a liquid container;
liquid circulating means disposed within said container for circulating liquid through a predetermined path so that bubbles are produced in the liquid when the quantity of same decreases below a particular level;

detector means for detecting said bubbles and for producing a corresponding detection signal having an A.C. and a D.C. component; and circuit means coupled to said detector means for producing a bubble signal corresponding to the A.C. component of said detection signal, and for varying said bubble signal in accordance with the D.C. component of said detection signal.

12. A liquid quantity detecting device comprising: a liquid container;

liquid circulating means disposed within said container for circulating liquid through a predetermined path so that bubbles are produced in the liquid when the quantity of same decreases below a particular level; and detector means for detecting said bubbles and for producing a corresponding detection signal, said detecting means comprising a light source and a light sensing element disposed so that said bubbles are detected in response to variations of light which passes through said liquid and said bubbles.

13. A liquid quantity detecting device comprising: a liquid container;

liquid circulating means disposed within said container for circulating liquid through a predetermined path so that bubbles are produced in the liquid when the quantity of same decreases below a predetermined level;

bubble detector means for detecting said bubbles and for producing a corresponding bubble signal means comprising a portion of said bubble detector means for detecting the concentration of said liquid and for producing a concentration signal when the concentration decreases below a predetermined value; and means for supplying concentrated liquid to said container in response to said concentration signal.

14. A liquid quantity detecting device according to claim 13, further comprising means for discontinuing the operation of said concentrated liquid supply means in response to a predetermined value of said bubble signal.

15. A device for detecting the quantity of developing liquid in a copying machine, comprising:

means for circulating the developing liquid through a predetermined path and for producing bubbles in said liquid when the quantity of same decreases below a particular level;

means disposed adjacent said path for detecting the bubbles and for producing a corresponding bubble signal; and means responsive to said bubble signal for indicating the decrease in quantity of the liquid.

16. A device according to claim 15, wherein said responsive means supplies replenishing liquid to said machine.

17. A device according to claim 15, wherein said responsive means discontinues the operation of said copying machine.

18. A device according to claim 15, further comprising a guide member for developing therein a latent image, and wherein said liquid circulating means comprises means for pumping up the liquid onto said guide member, and means to direct the liquid moved by said pumping means, said detecting means being adapted to detect those of the bubbles which pass through said directing means.

19. A device according to claim 15, further comprising means for detecting the concentration of the developing liquid and means for supplying toner in response to a signal from said concentration detector means representing a concentration below a predetermined level, said concentration detector means being common with said bubble detector means.

20. A device according to claim 19, wherein said supply means is operable in response to a timing signal for operation of the copying machine and said concentration detection signal, and means is further provided which is operable when the supply operation is not completed during the time of the next timing signal, to produce a signal representing the exhaustion of replenishment toner.

* * * * *

UNITED STATES PATENT OFFICE
CERTIFICATE OF CORRECTION

Patent No. 4,008,612  Dated February 22, 1977

Inventor(s) Tateki Nagaoka et al.

It is certified that error appears in the above-identified patent and that said Letters Patent are hereby corrected as shown below:

Column 9, line 65  After "inoperative", insert --irrespective--;

Column 11, line 38  Change "of", to read --if--

IN THE CLAIMS:

Claim 3, column 12, line 9  Change "and" to read --said--.

Signed and Sealed this

Third Day of May 1977

[SEAL]

Attest:

RUTH C. MASON  
Attesting Officer

C. MARSHALL DANN  
Commissioner of Patents and Trademarks